3,457,282
GLYCIDOL RECOVERY PROCESS
Roger J. Polak, Mount Carmel, Conn., and Joel A. Zaslowsky, Baltimore, Md., assignors to Olin Mathieson Chemical Corporation, a corporation of Virginia
No Drawing. Filed June 1, 1966, Ser. No. 554,316
Int. Cl. C07d 1/04, 1/02
U.S. Cl. 260—348.6       2 Claims

ABSTRACT OF THE DISCLOSURE

Glycidol is recovered from a reaction mixture containing glycidol, water, salt and glycerol monohalohydrin by extraction with a saturated aliphatic ketone having from 4–7 carbon atoms followed by distillation.

---

This invention relates to a process for the recovery of hydroxy-epoxides from aqueous reaction mixtures. More particularly, it relates to the extraction of glycidol from aqueous salt solutions with selected solvents.

The hydroxy-epoxides are valuable compounds which are useful for a wide variety of solvent extraction and preparation purposes. They are employed in surfactant formulations and as extractants in numerous vegetable, animal and mineral oil extraction processes. They are also valuable as intermediates in the preparation of many useful organic compounds such as polyhydric alcohols, polyhydric alcohol ethers and esters, glycidol ethers and esters, carbonylic compounds, glyptal resins, etc.

Hydroxy-epoxides are generally provided by the alkaline treatment of saturated or unsaturated halogenated polyhydric alcohols wherein hydrogen halide is removed from the halogenated polyhydric alcohol. As a result of this step, a reaction mixture is obtained which contains the hydroxy-epoxide, water, a salt, unreacted halogenated polyhydric alcohol and some products of hydration of the hydroxy-epoxide. However, isolation of the desired hydroxy-epoxide from such a reaction mixture is known to be the primary difficulty in the production of hydroxy-epoxides, since the desired epoxide reacts with water, salts, acids and bases to produce undesirable by-products.

Thus, distillation in the presence of a saturated aqueous salt solution causes a reversible reaction to occur, whereby the hydroxy-epoxide reacts with halide ion from the salt to form the halogenated polyhydric alcohol, thereby decreasing the yield of hydroxy-epoxide. This problem was recognized in U.S. Patent 2,248,635 wherein a similar reaction mixture containing an organic solvent was preferably filtered to remove excess salt prior to distillation. However, a substantial amount of salt is still present in the filtrate which encourages the previously described reversible reaction upon distillation.

The problem of isolating a hydroxy-epoxide without decomposition or by-product formation is extremely important in the commercial production of glycidol, i.e. "1,2-epoxy propanol-3" and this invention is particularly directed to an improved process for quantitatively removing glycidol from the crude reaction mixture prior to final purification. Thus, this invention eliminates the previously defined reversible reaction and by-product formation from the recovery step.

Briefly, the reaction mixture is prepared by treating a glycidol monohalohydrin with a base in an aqueous reaction medium. Among the suitable bases which may be employed in the production of glycidol are the metal oxides, the metal hydroxides, the metal carbonates, the metal bicarbonates, the metal borates, etc. Preferably employed bases are the alkali metal hydroxides, such as sodium and potassium hydroxide and the like. Thus, when glycerol monochlorohydrin is treated with sodium hydroxide, a reaction mixture containing glycidol, sodium chloride, water, glycerol monochlorohydrin and glycerol is obtained.

The process of this invention relates to the use of saturated aliphatic ketones having from 4 to 7 carbon atoms for the selective extraction of glycidol from the reaction mixture. Illustrative of such ketones are methyl ethyl ketone, methyl isopropyl ketone, diethyl ketone, methyl n-propyl ketone, dipropyl ketone and the like. It has been found that a quantitative separation of glycidol from the reaction mixture is thus provided. Furthermore, it has been found the high yield of glycidol provided by the alkaline treatment of the glycerol monohalohydrin is recovered by successive extractions of the reaction mixture with a ketone of the class defined herein. After the glycidol has been extracted from the reaction mixture, pure glycidol is conveniently obtained by a conventional technique such as distillation, without subjecting the glycidol to the aforementioned side-reactions. The efficacy of the ketones of this invention is particularly surprising since it has been found that acetone does not effect a quantitative separation of salt and glycidol, and thus is unsuitable in the process of this invention.

The following examples serve to illustrate the practice of this invention.

Example 1

Fifty grams of a 47 percent aqueous glycerol monochlorohydrin solution were charged to a 125 ml. Erlynmeyer flask. The flask was then placed in an ice bath. When the temperature of the solution had fallen to 10°–15° C., 15.2 ml. of a 40 percent NaOH solution were added dropwise, with stirring. During the addition, salt separated from the solution. At the end of the addition, the reaction mixture was filtered to remove the excess salt. Vapor phase chromatographic analysis of the clear filtrate revealed that a 95 percent yield of glycidol had been obtained. Seventy grams of methyl ethyl ketone (MEK) were added to the 70.5 gms. of filtrate in a 250 ml. Erlynmeyer flask. The flask was stoppered and shaken. After standing for a few minutes, the mixture separated into two liquid phases, which were separated utilizing a separatory funnel. The aqueous bottom layer weighed 59.5 gms.; the organic upper layer weighed 74.1 gms. A sample from each layer was analyzed by vapor phase chromatography. The areas under the curves obtained for the samples from the aqueous and organic layers were compared with the areas under the curves for 5 percent solutions of pure glycidol in water and methyl ethyl ketone respectively. This comparison revealed that the aqueous layer contained 62 percent by weight of the total glycidol originally present in the 70.5 gms. filtrate sample and the organic layer contained the remaining 38 percent. Several additional extractions of the filtrate with MEK were performed and the data is set forth in the following table.

| Extraction | MEK added in gms. | Separation (grams) | | Glycidol partition, percent | |
|---|---|---|---|---|---|
| | | Aqueous Layer | MEK Layer | Aqueous Layer | MEK Layer |
| 2 | 59.5 | 50 | 64 | 64 | 36 |
| 3 | 50 | 44 | 57 | 65 | 35 |
| 4 | 44 | 40 | 46 | 67 | 33 |
| 5 | 40 | 36 | 42 | 67 | 33 |

The methyl ethyl ketone extracts were combined, and a sample therefrom analyzed by vapor phase chromatography, which revealed that 82 percent of the glycidol present in the filtrate had been recovered by the successive extractions.

The solution was then tested for chloride content by the Volhard method. The absence of chloride indicated that no salt had been extracted into the organic layer. The flask containing the organic layers was allowed to sit at room temperature for 24 hours. Vapor phase chromatographic analysis indicated no loss of glycidol.

Example 2

Following the procedure of Example 1, 100 grams of a 47 percent aqueous glycerol monochlorohydrin solution was reacted with 30.4 ml. of a 40 percent NaOH solution. After filtration, the solution weighed 140 gms. Vapor phase chromatographic analysis of the clear filtrate revealed that a 95 percent yield of glycidol had been obtained. An equal weight of methyl ethyl ketone was added and the layers separated. The filtrate was extracted six times and the data therefor are set forth in the following table.

| Extraction | MEK added (gms.) | Separation (grams) | |
|---|---|---|---|
| | | Aqueous layer | MEK layer |
| 1 | 140 | 120 | 148 |
| 2 | 120 | 100 | 128 |
| 3 | 100 | 88 | 114 |
| 4 | 88 | 80 | 92 |
| 5 | 80 | 72 | 84 |
| 6 | 72 | 65 | 79 |

After combination, the methyl ethyl ketone extracts weighed 645 gms. Vapor phase chromatographic analysis revealed that 85 percent by weight of glycidol in the filtrate had been recovered. Pure glycidol, boiling point 166°–167° C., was isolated by distilling the combined MEK extracts through a 24 inch glass helices-packed column.

We claim:

1. In a process for the conversion of glycerol monohalohydrin to glycidol wherein the glycerol monohalohydrin is reacted with a base in an aqueous solution, thereby producing a reaction mixture containing glycidol, water, salt and unreacted glycerol monohalohydrin, the improvement which comprises extracting the glycidol from the reaction mixture with methyl ethyl ketone and recovering the glycidol from said extract by a distillation technique.

2. In a process for the conversion of glycerol monochlorohydrin to glycidol wherein the glycerol monochlorohydrin is reacted with an alkali metal hydroxide in an aqueous solution, thereby producing a reaction mixture containing glycidol, water, alkali metal chloride and unreacted glycerol monochlorohydrin, the improvement which comprises extracting the glycidol from the reaction mixture with methyl ethyl ketone and recovering the glycidol from said extract by a distillation technique.

References Cited

UNITED STATES PATENTS 2,967,186    1/1961    Gordon et al. _____ 260—348.6
3,061,615    10/1962   Viriot et al. _____ 260—348.6

NORMA S. MILESTONE, Primary Examiner